Feb. 16, 1971 — A. R. BARRINGER — 3,563,663
ANALYSIS OF SPECTRA BY CORRELATION OF INTERFERENCE PATTERNS
Filed July 13, 1967 — 3 Sheets-Sheet 1

ANTHONY RENE BARRINGER
INVENTOR

BY Rogers, Bereskin & Parr

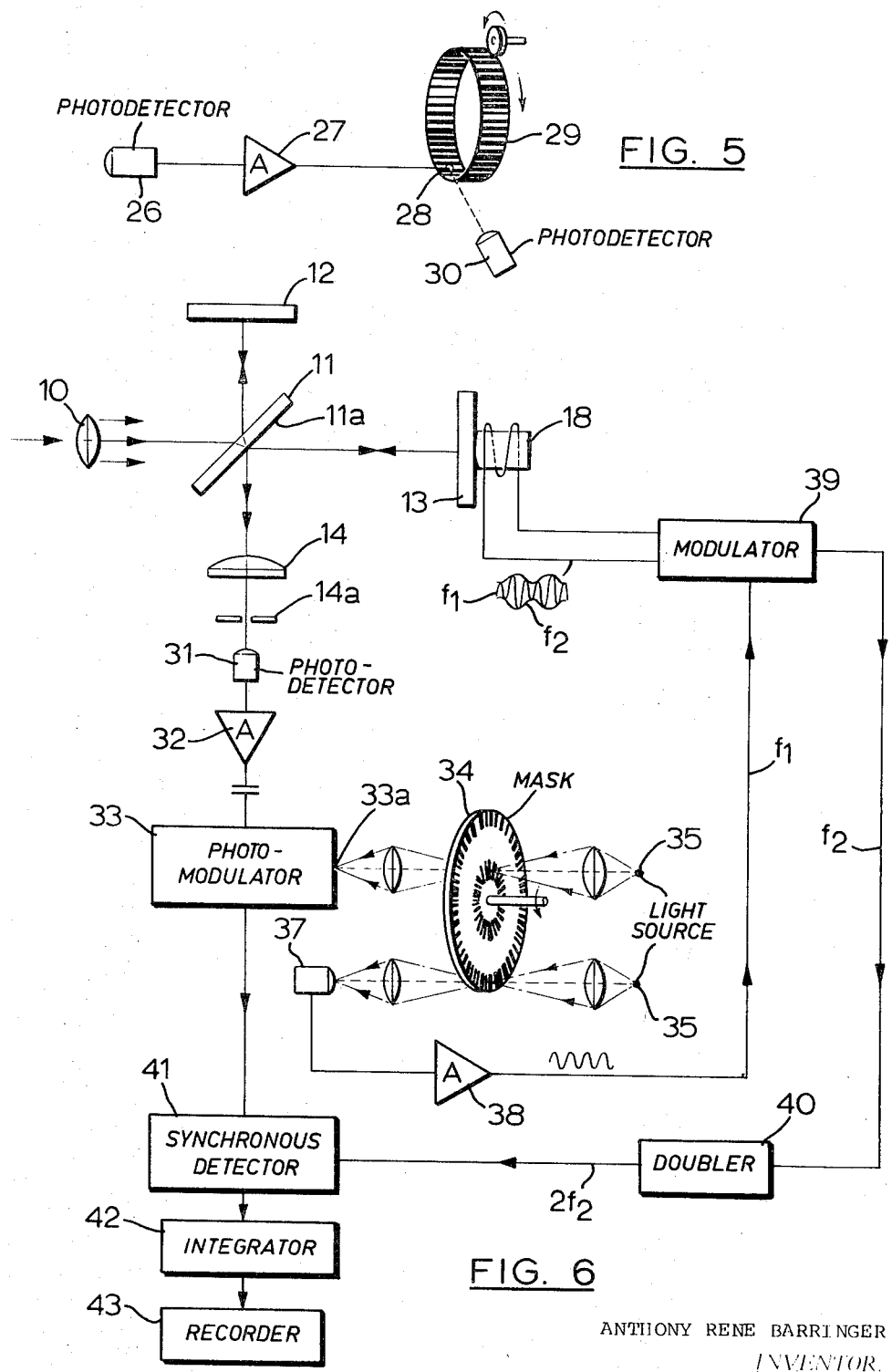

United States Patent Office 3,563,663
Patented Feb. 16, 1971

3,563,663
ANALYSIS OF SPECTRA BY CORRELATION OF INTERFERENCE PATTERNS
Anthony Rene Barringer, Willowdale, Ontario, Canada, assignor to Barringer Research Limited, Rexdale, Ontario, Canada, a corporation
Filed July 13, 1967, Ser. No. 653,228
Claims priority, application Great Britain, July 13, 1966, 31,363/66
Int. Cl. G01b 9/02
U.S. Cl. 356—106                                             4 Claims

ABSTRACT OF THE DISCLOSURE

A scanning interferometer of the Michelson type wherein the path length difference of the two interfering beams in the interferometer is continuously varied in a predetermined manner, and a rotatable mirror is provided for scanning or dispersing the emergent, intensity modulated light synchronously with the varying path length difference across a mask containing a series of lines corresponding to a pattern produced by intensity modulated light of known spectral content.

---

Figure 1:
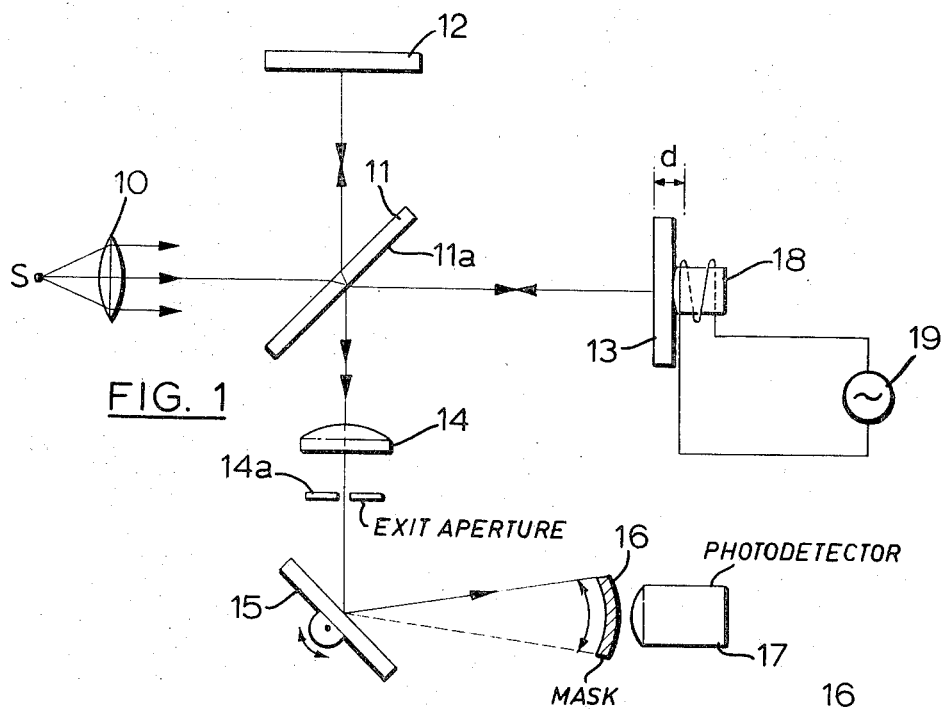

This invention relates to the art of spectroscopy and in particular to a method and apparatus for analyzing spectra by examining interference effects in light of unknown spectral content.

An interferometer is an optical instrument that is used to observe interference between two or more beams of light, and it is primarily used to measure the wavelength of light and to measure very small distances and thicknesses in terms of wavelength of light. A widely used interferometer is one devised by Professor A. A. Michelson. In the Michelson interferometer, light from a narrow angle source is split into two beams and then re-combined into a single beam. As the path length of one of the two beams is varied relative to the other, the two beams interfere constructively or destructively, depending on the difference in path length. Two mirrors are used for reflecting the two beams, and when the images of the mirrors are exactly parallel, circular interfeernce fringes are formed. When the images of the mirrors are not quite parallel, substantially straight or slightly curved fringes are formed. The Michelson interferometer can be used as a spectrometer for analysing the spectral content of polychromatic light. As the path length of one of the two split beams is changed, the intensity of the light emerging from the interferometer is modulated in a manner that is characteristic of the spectrum of the incoming light. Assuming that one of the two mirrors is moved linearly with time from the position where the path difference of the two beams is zero, the equation for the modulated intensity of the emergent light can be written $$I(t) = \int_0^\infty I(\lambda) \cos^2 \frac{\beta t}{\lambda} d\lambda$$

where $\beta$ is a constant, and $I(\lambda)$ is the intensity of the incident light at different wavelengths $\lambda$. Heretofore the intensity distribution of the emergent light was obtained by means of Fourier analysis using a computer in order to recover the spectrum.

The present invention is designed to analyze light of unknown spectral content without requiring Fourier analysis and a computer or other complex electronic apparatus. According to one embodiment of the invention, the path difference of the two interfering beams is continuously varied in a predetermined manner, and means is provided for scanning or dispersing the resulting intensity modulated light synchronously with the varying path difference across a mask containing a series of lines corresponding to a pattern produced by intensity modulated light of known spectral content. A photodetector is placed behind the mask, and the output size of the photodetector is an indication of the degree of cross correlation between the pattern produced by the emergent light and the pattern of lines on the mask. The invention is applicable to light of the visible, ultraviolet and infrared regions of the spectrum, and principles of the invention are also applicable to other electromagnetic radiation which can be collimated such as X-rays and microwaves in the millimeter and centimeter regions.

Figure 2:
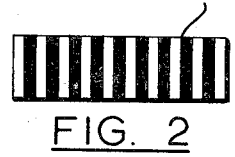
Figure 3:
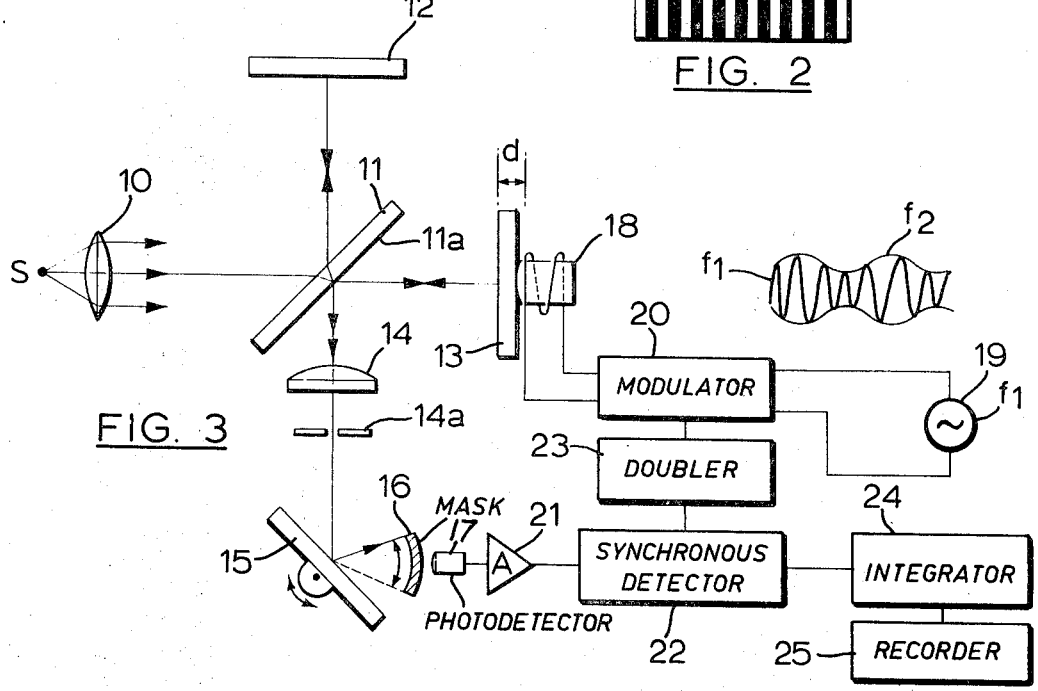
Figure 4:
Figure 7:
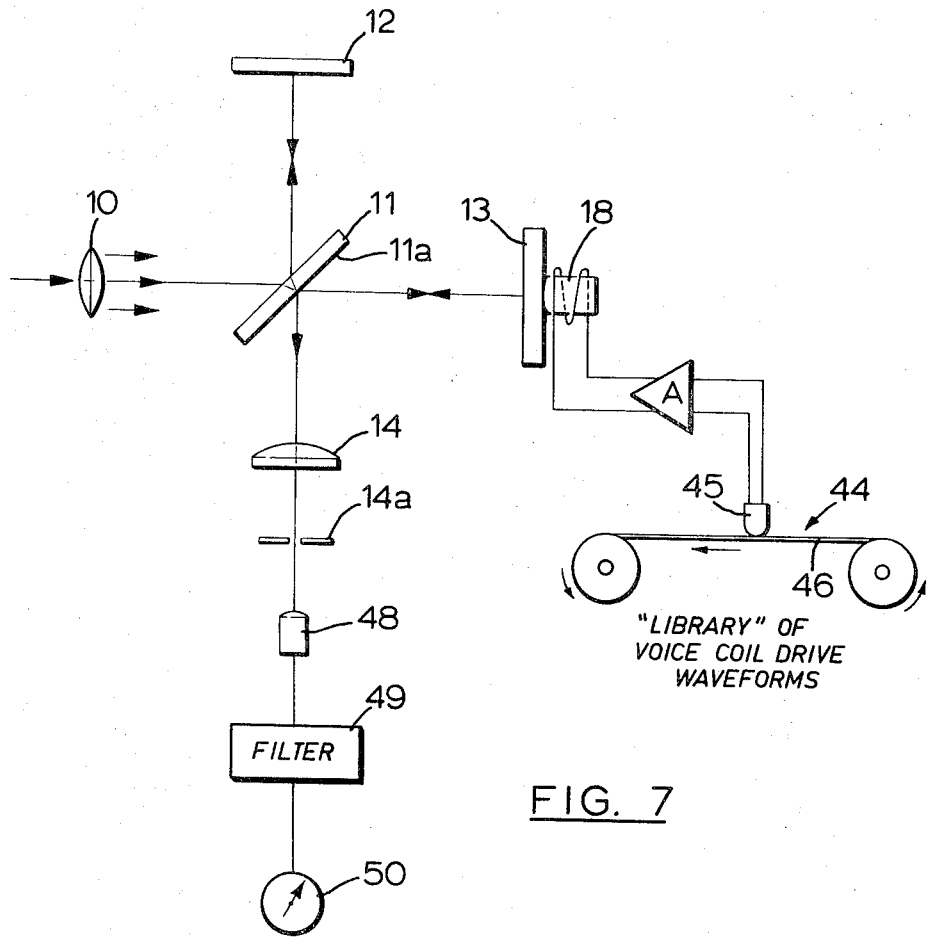

Preferred examples of the invention are illustrated in the accompanying drawings, wherein:

FIG. 1 is an optical and electrical diagram showing, somewhat diagrammatically, principal component parts of a simplified spectrophotometer incorporating features of the invention, FIG. 2 is a plan view of a mask shown in FIG. 1, FIG. 3 is an optical and electrical diagram of another embodiment of the invention, FIG. 4 is a plan view of another mask, FIG. 5 is a simplified view showing another arrangement for dispersing the emergent light, FIG. 6 is a combined optical and electrical diagram of a further embodiment of the invention, and FIG. 7 is an optical and electrical diagram of yet another embodiment of the invention.

The beam splitting arrangement shown in FIG. 1 and the other figures is similar to that of the Michelson interferometer, although other beam splitting arrangements could be used as indicated below. Light from a narrow angle source S such as a slit is collimated by means of a lens 10 and the resulting parallel light is incident at an angle of 45° on a half-silvered plate 11. Half of the incident light is reflected from a reflecting surface 11a of the plate 11 towards a fixed mirror 12. The remaining half of the incident light is directed towards a mirror 13 that is adapted to oscillate back and forth in a manner discussed in more detail below. Light (hereafter usually called "emergent light") which has reflected from both mirrors 12 and 13 is re-combined and focussed by means of a lens 14. After passing through the lens 14, the emergent light shines on an angularly reciprocable mirror 15 from which it is reflected to a mask 16. Any light shining through the mask 16 is detected by means of a photodetector 17 such as a photomultiplier or other like photosensitive transducer. The function of the mirror 13 is to continuously vary the path length difference of the two split beams so that time varying interferences will occur when the two split beams are re-combined.

The mirror 13 is conveniently oscillated by securing the mirror 13 to a conventional loudspeaker voice coil 18 assembly. The voice coil 18 is energized by an A.C. generator 19 of predetermined frequency and amplitude. The amplitude of the A.C. voltage energizing the voice coil 18 determines the total distance the mirror 13 travels, and the frequency of the A.C. voltage determines the frequency of interferences in the light shining on the mask 16. It is preferable that the mirror 12 should not be exactly perpendicular to the mirror 13 so that the resulting interference fringes are substantially linear as shown in FIG. 2. An exit aperture 14a preferably is provided to permit only the central fringes of the emergent light to pass through it. Thus the light shining on the mask 16 is constituted by the central fringes only.

For the sake of clarity, the operation of the apparatus of FIG. 1 will first be described in terms of monochromatic light entering the apparatus (hereafter called incident light). Assuming that the maximum amplitude of the oscillation of the mirror 13 (i.e. distance $d$ in FIG. 1) is equal in length to 500 wavelengths of the incident light, and the oscillation frequency is 60 cycles per second, then the total path length of the beam reflected from the mirror 13 will change by 1,000 wavelengths for each cycle of oscillation. This will result in 1,000 constructive and destructive interferences or beats in the emergent light for each oscillation of the mirror 13, and a total of 60,000 beats per second. It is convenient to regard the interferences as Doppler beats. The above beat frequency would be a constant if the motion of the mirror 13 was perfectly linear, however it is more convenient to cause the mirror 13 to move with simple harmonic motion so that the Doppler beat frequency is frequency modulated at the frequency of the A.C. voltage energizing the voice coil 18, e.g. 60 cycles per second.

The mirror 15 is adapted to angularly reciprocate in synchronism with the mirror 13. More particularly, at the rest position of the mirror 13, the mirror 15 is at one limit of its travel so that the light reflected from it is directed to one end of the mask 16 (see solid line ray in FIG. 1). When the mirror 13 has completed a full cycle of oscillation (i.e. it has returned to its initial rest position), the mirror 15 is then at the opposite limit of its travel so that the reflected light is directed to the opposite end of the mask 16 (see dotted line ray in FIG. 1). Thus, for every cycle of oscillation of the mirror 13, the mirror 15 causes the emergent light (consisting of the central fringes) to scan the mask 16 once. Similarly, the motion of the mirror 15 is exactly synchronized with the next oscillation of the mirror 13. As long as the moving components of the apparatus are carefully made so that the oscillatory motion of the mirror 13 is precisely symmetrical with the angular oscillation of the mirror 15, the result is that a stationary sweep pattern of lines of light will appear on the mask 16, and the position of the lines remains the same in both directions of travel of the mirror 15. The spacing between the lines is fairly uniform as the action of the mirrors 13 and 15 is self-compensating to a considerable extent. The mirror 13 travels more slowly in the vicinity of the two limits of its travel, and therefore in this region the Doppler beat frequency of the emergent light is somewhat lower and the beats are spaced further apart in time. However, the mirror 15 also travels more slowly at the same time as the mirror 13 because the two mirrors are synchronously driven, and therefore the emergent light is dispersed less. This tends to even the spacing between the lines, although the spacing is still subject to small mechanical errors.

The mask can be prepared by exposing a piece of photographic film to the emergent light in the focal plane of the lens 14. The photographic film is preferably enhanced in contrast, either by conventional photographic techniques or by re-touching the lines by hand. If the mask 16 is placed in front of the photodetector 17, and the interference pattern of the intensity modulated emergent light correlates with the lines on the mask, maximum light is permitted to shine through the mask 16 and the output of the photodetector 17 is a maximum. If the amplitude of oscillation of the mirror 13 is slightly changed, correlation no longer will be perfect, and the light shining through the mask 16 will be considerably diminished in intensity. However, if the amplitude of oscillation of the mirror 13 is restored to its original condition, the output of the photodetector 17 will proportionally increase and become a maximum at the point of exact correlation.

The invention can be used as a direct reading or recording spectrophotometer. If the wavelength of the monochromatic light entering the apparatus is changed from the original wavelength, correlation with the lines on the correlation mask can again be achieved by varying the amplitude of the A.C. voltage energizing the voice coil 18 until the amplitude of oscillation of the mirror 13 again produces 1,000 beats per cycle, which is revealed by a maximum output of the photodetector 17. Thus the amplitude of the A.C. voice coil energizing voltage is directly related to the wavelength of the incoming light for maximum correlation. It is important that the mirror 13 should maintain an undistorted sinusoidal motion when varied from very small amplitude motions of, for example, 100 microns or less to a centimeter or more. Actually this is not very difficult to achieve with well made loudspeaker voice coils. When the two mirrors 13 and 15 are operated in the manner described above an identical pattern of interferences can be obtained at the mask 16 through a broad range of monochromatic wavelengths, merely by adjusting the amplitude of the A.C. voltage energizing the voice coil 18.

It is apparent from the above that if the incoming light contains a number of spectral lines, the amplitude of the A.C. voice coil voltage can be adjusted to find points of maximum output of the photodetector 17. The points of maximum output correspond with the wavelengths of individual lines in the incoming light.

Another application of the invention relates to the analysis of gases having complex banded absorption spectra. If a sample of a gas having a characteristic complex banded absorption spectrum is placed in front of the entrance aperture of the apparatus, and a continuum source of light is caused to shine through the gas into the apparatus, the characteristic complex spectrum will produce a complex output of light intensity at the correlation mask. A piece of film can be exposed in the manner described above, and the resulting mask characterizes the particular gas and no other. The same mask can therefore be used for determining whether the particular gas is present in an unknown sample of gas.

The apparatus of FIG. 3 is provided with signal processing equipment for automatic spectrum scanning and can be used to identify a particular substance having a characteristic spectrum. The optical elements of the apparatus are similar to those of FIG. 1, so further description of these is unnecessary. In this case, however, instead of being energized by an A.C. voltage of fixed amplitude, the voice coil 18 is energized by an A.C. voltage $f_1$ that is amplitude modulated at a relatively low frequency $f_2$ by a modulator 20. At some point in the period of the wave $f_2$, exact correlation will occur between the lines on the correlation mask 16 and the emergent light, and as correlation will occur twice during every cycle of the voltage $f_2$, the output of the photodetector 17 will have an A.C. component of twice the frequency of the voltage $f_2$. The output of the photodetector 17 is amplified by an amplifier 21, and then is rectified by a synchronous detector 22 that is synchronized with a reference voltage from a frequency doubler 23. The doubler 23 is connected to the modulator 20 so that its output, which is the reference voltage for the synchronous detector, is twice the frequency of the voltage $f_2$. The output of the synchronous detector 22 is integrated by an integrator 24 and displayed by a recorder 25 or other conventional display apparatus. All the electronic elements described above are conventional.

In FIGS. 1 and 3, the emergent light was dispersed by means of the angularly reciprocating mirror 15. In FIGS. 5 and 6, alternative forms of dispersion are provided. In FIG. 5, which is a highly simplified view intended to show the basic concept, the intensity modulated emergent light from the mirror 11 (not shown) shines on a photodector 26 which replaces the mirror 15 of FIGS. 1 and 3. The output of the photodetector 26 is amplified by an amplifier 27 which energizes a small lamp 28 such as a gallium arsenide diode capable of being modulated at high frequency. The intensity of the light produced by the lamp 28 is a function of the intensity of the light shining on the photodetector 26 with respect to time. Light from the lamp 28 is caused to shine through a circular correlation mask which is rotated in synchronism with the motion of the mirror 13. The light shining through the mask 29 is directed towards a photodetector 30 and then is processed in the manner described above with reference to FIG. 3.

A somewhat more sophisticated form of the apparatus is illustrated in FIG. 6. Again, the principal optical elements are the same as those of FIGS. 1 and 3, and as in the case of FIG. 5, the angularly vibrating mirror 15 is replaced with a photodetector (identified by reference numeral 31 in FIG. 6). The output of the photodetector 31 is amplified by an amplifier 32 the output of which is A.C. coupled to a photo-modulator 33. The photomodulator 33 is a circuit utilizing a photosensitive device such as a photodiode or phototransistor with a photosensitive face 33a. The photosensitive device is used in conjunction with an electronic gate to modulate the output of the photodetector 31. In this embodiment a correlation mask 34 in the shape of a disc is provided with two sets of indicia. The inner set contains correlation lines corresponding to a particular spectrum. Light from a small light source 35, such as a gallium arsenide cell, is directed by a suitable system of lenses through the mask 34 and then onto the sensitive face 33a. When variations in the light shining on the photodetector 31 correlate with variations in the light shining on the sensitive face 33a, the output of the photo-modulator 33 acquires a D.C. component the amplitude of which is proportional to the degree of correlation. The mask 34 is rotated by any conventional means, and the rotation frequency of the mask 34 is accurately sensed by means of a second set of lines arranged about the periphery of the mask 34. Another light source 36 shines through the second set of lines and is directed to a photodetector 37. The output of the photodetector 37 consists of a sinusoidal voltage of a frequency equal to the rotation frequency of the mask 34. The output of the photodetector 37 is amplified by an amplifier 38 and is fed to a modulator 39. In this case, the rotation frequency of the mask 34 is represented by frequency $f_1$, and this voltage is modulated at a relatively low frequency $f_2$ by the modulator 39. A frequency doubler 40 is adapted to convert the frequency $f_2$ to frequency $2f_2$, and A.C. voltage of the latter frequency is fed to a synchronous detector 41 to provide a reference voltage therefor. The output of the photo-modulator 33 is detected by the synchronous detector 41, the output of which is then fed to an integrator 42 and then to a recorder 43 or other conventional display apparatus.

An advantage of the embodiments of FIGS. 5 and 6 is that by detecting the intensity modulated emergent light with a photodetector and then dispersing it in time, a narrow entrance slit or a narrow angle source of light no longer is necessary, and thus the sensitivity of the apparatus is improved because more light is permitted to shine through the system. In effect, the resolution of the system, instead of depending on the width of an entrance slit, depends on the size of the lamp 28 (FIG. 5) or 35 (FIG. 6), which can be made very small. Alternatively, these small lamps could be replaced with the electron beam of an oscilloscope, which could be intensity modulated to achieve a similar result. A correlation mask would be placed on the oscilloscope screen and the screen viewed through the mask by means of a second photodetector. In addition, instead of using only one channel (i.e. one mask) the emergent light can be used to illuminate a plurality of masks so that multiple outputs can be obtained by simultaneously correlating for large numbers of spectra without splitting the original light beam. In the embodiments of FIGS. 5 and 6, the emergent light is detected by a photodetector and correlated with light shining through a mask having a pattern of lines corresponding to light of known spectral content. An alternative arrangement is shown in FIG. 7. Instead of an optical mask, means is provided for programming the mirror 13 so that its motion correlates with the incoming light with the result that the intensity of the emergent light is varied in a manner characteristic of light of known spectral content. The programming means may consist, for example, of a tape playback mechanism 44 having a playback head 45 for sensing a magnetic tape 46 containing program information. The output of the playback head 45 is amplified by an amplifier 47 that is adapted to energize the voice coil 18. A photodetector 48 senses the emergent light, and the output of the photodetector 48 is fed to a filter that is adapted to pass waveforms of predetermined characteristics. A suitable voltage level indicator 50 measures the output of the filter 49.

If the incoming light is monochromatic, for example, the magnetic tape 46 may be programmed so that the voltage sensed by the playback head 45 is a sinusoidal voltage of predetermined frequency. The output of the photodetector 48 is therefore a frequency modulated wave with a fundamental frequency and a modulation index respectively determined by the amplitude and frequency of the voltage energizing the voice coil 18 (see description of operation of embodiment of FIG. 1, supra). The resulting frequency modulated wave is therefore characteristic of light of a particular wavelength. In general, it appears that the required voltage to be applied to the voice coil 18 is the Fourier transform of the spectrum of the incoming light. Thus a "library" of Fourier transforms can be recorded on the magnetic tape, each corresponding to a particular spectrum of light. In some cases it may be difficult to design a filter responsive to certain waveforms, such as sawtooth functions. In such cases a waveform generator could be used for producing the characteristic waveform, e.g. a sawtooth, and both the reference waveform and the output of the photodetector could be fed into a conventional multiplier where they would be multiplied together. If the two waveforms correlated, maximum voltage would be observed in the output of the multiplier.

The embodiments of the invention described above utilize the elements of the Michelson interferometer in order to produce a beam of light containing interferences. However, it will be understood that principles of the invention can be applied to other forms of interferometers, such as a Fabrey-Perot interferometer in which the spacing between a pair of partially reflecting parallel plates is modulated.

What I claim as my invention is:

1. An interferometer comprising:
 (a) means for separating light entering the interferometer into two beams of variable path length difference, including means for recombining said two beams,
 (b) means for cyclically varying the path length difference of the two beams at a rapid rate of repetition so that when the two beams are recombined the intensity of the resulting beam is varied in a manner characteristic of the spectrum of the light entering the interferometer, said path length varying means comprising a loudspeaker voice coil connected to a source of alternating current of adjustable amplitude and frequency and a mirror secured to the voice coil and positioned to reflect one of said two beams, said alternating current being amplitude modulated by a modulator,
 (c) mask means defined by a pattern of opaque lines with transparent spaces between them, said pattern of lines being characteristic of light of known spectral composition,
 (d) means synchronized with said path length varying means for cross correlating the intensity variations in said resulting beam with said pattern of lines, and
 (e) analyzing means coupled to said cross correlating means for indicating the degree of cross correlation between the pattern of lines on the mask means and the intensity variations in said resulting beam, said analyzing means including a photodetector positioned to receive the recombined beam after said recombined beam has passed through the mask means, an amplifier connected to the output of the photodetector, a synchronous detector connected to the output of said amplifier, a frequency doubler having an input connected to said modulator and an output connected to said synchronous detector for synchronizing said synchronous detector, and means for indicating the output of said synchronous detector.

2. An interferometer as claimed in claim 1 wherein the cross correlating means includes a pivotable mirror positioned to reflect said resulting beam towards said mask means, and means for angularly oscillating said pivotable mirror in synchronism with the motion of the mirror secured to said loudspeaker voice coil.

3. An interferometer as claimed in claim 1 wherein the cross correlating means includes a first photodetector positioned in the path of said resulting beam, an amplifier connected to said first photodetector, a first lamp positioned to direct a narrow beam of light through said mask means, a photomodulator connected to said amplifier and positioned to receive the light passing through said mask means so that the output of the photomodulator includes a direct current component when the output of the amplifier correlates with intensity variations in the light which has passed through said mask means, and means for rotating said mask means relative to said first lamp in synchronism with said mirror secured to said loudspeaker voice coil; wherein said mask means comprising a disc with said pattern of lines disposed radially on said disc, and wherein said source of alternating current comprises means for deriving an alternating current voltage having a frequency proportional to the speed of rotation of said disc.

4. An interferometer as claimed in claim 1 wherein the analyzing means includes a synchronous detector connected to the output of said photomodulator, a frequency doubler having an input connected to said modulator and an output connected to said synchronous detector for synchronizing the same, and means for indicating the output of said synchronous detector.

References Cited

UNITED STATES PATENTS

| 3,012,467 | 12/1961 | Rosenthal | 356—83 |
| 3,202,052 | 8/1965 | Rambauske | 356—106 |
| 3,286,582 | 11/1966 | Mertz | 356—106 |

RONALD L. WIBERT, Primary Examiner

C. CLARK, Assistant Examiner

U.S. Cl. X.R.

250—237